(12) United States Patent
Jo

(10) Patent No.: US 9,164,637 B2
(45) Date of Patent: Oct. 20, 2015

(54) TOUCH SENSING DEVICE

(71) Applicant: LG Display Co., Ltd., Seoul (KR)

(72) Inventor: Youngwoo Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/082,631

(22) Filed: Nov. 18, 2013

(65) Prior Publication Data

US 2014/0176488 A1 Jun. 26, 2014

(30) Foreign Application Priority Data

Dec. 24, 2012 (KR) .................. 10-2012-0152487

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0416* (2013.01)

(58) Field of Classification Search
CPC ..... G06F 3/044; G06F 3/0412; G06F 3/0416; H03K 17/955; H03K 17/962; G01D 5/24; G01R 24/2605
See application file for complete search history.

(56) References Cited

U.S. PATENT DOCUMENTS

| | | | | |
|---|---|---|---|---|
| 7,812,652 | B2* | 10/2010 | Mei | 327/156 |
| 2009/0009483 | A1* | 1/2009 | Hotelling et al. | 345/173 |
| 2010/0051354 | A1* | 3/2010 | Ningrat et al. | 178/18.06 |
| 2012/0306802 | A1* | 12/2012 | McCracken | 345/174 |

\* cited by examiner

*Primary Examiner* — Jonathan Boyd
*Assistant Examiner* — Sardis Azongha
(74) *Attorney, Agent, or Firm* — Fenwick & West LLP

(57) ABSTRACT

A touch sensing device includes a display panel including a touch screen on which a plurality of touch sensors are formed, a touch sensing circuit including at least one sensing unit which receives self capacitance signals of a first touch sensor and a second touch sensor adjacent to the first touch sensor at differential input method and detects changes in capacitances of the first and second touch sensors, and a touch controller which analyzes touch raw data received from the touch sensing circuit and calculates coordinates of a touch input position. The sensing unit generates delays corresponding to a difference between the capacitances of the first and second touch sensors, accumulates the number of delays, converts an accumulated value of the delays into digital data, and generates the touch raw data.

10 Claims, 12 Drawing Sheets

No touch input (A) No touch input (B) Touch input to touch sensor outputting T[1]

(C) Touch input to touch sensor outputting T[2]

(A) Related art      (B) Embodiment of the invention

TOUCH SENSING DEVICE

CROSS-REFERENCE TO RELATED APPLICATION

This application claims the benefit of Korean Patent Application No. 10-2012-0152487 filed on Dec. 24, 2012, which is incorporated herein by reference for all purposes as if fully set forth herein.

BACKGROUND OF THE INVENTION

1. Field of the Invention

Embodiments of the invention relate to a touch sensing device.

2. Discussion of the Related Art

User interface (UI) is configured so that people (users) are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technologies have continuously expanded to increase user's sensibility and handling convenience. The user interface has been recently developed to include touch UI, voice recognition UI, 3D UI, etc., and the touch UI has been basically installed in portable information devices. A touch screen is installed on a display element of household appliances or the portable information devices, so as to implement the touch UI.

A capacitive touch screen has durability and definition better than an existing resistive touch screen and is able to recognize a multi-touch input and a proximity touch input. Hence, the capacitive touch screen has the advantage of being able to be applied to various applications. Examples of the capacitive touch screen include a mutual capacitance touch screen using a mutual capacitance as a touch sensor and a self capacitance touch screen using a self capacitance as a touch sensor. As shown in FIG. 1, a self capacitance touch screen supplies a constant current to a self capacitance Cp until a voltage charged to the self capacitance Cp reaches a target voltage Vth, and turns on or off a switch SW in response to an output signal Fo of a comparator every predetermined period of time, so as to detect whether or not a touch operation is performed. Then, the self capacitance touch screen compares a time it takes for the voltage charged to the self capacitance Cp to reach the target voltage Vth with a previously determined critical value. As shown in FIG. 2, a time it takes for a charge voltage VCp of the self capacitance Cp to reach the target voltage Vth is counted according to oscillator clocks produced inside the self capacitance touch screen. The time required in the touch operation is longer than the time required in the non-touch operation. When the required time is equal to or greater than the critical value, the self capacitance touch screen decides a currently sensed touch sensor as a touch sensor corresponding to a touch input position.

In the related art self capacitance touch screen, sensing sensitivity has to increase so as to increase the touch sensitivity a user feels and accurately recognize a touch input trace or a dragging trace. However, because the related art self capacitance touch screen necessarily requires counting clocks of a high frequency so as to improve the sensing sensitivity, power consumption increases. Furthermore, because the related art self capacitance touch screen may perform a sensing operation only once within a given period of time, a detection capacity of a finger capacitance less than the self capacitance is reduced.

SUMMARY OF THE INVENTION

Embodiments of the invention provide a touch sensing device capable of improving a touch detection capacity without using clocks of a high frequency and implementing low power consumption.

In one aspect, there is a touch sensing device comprising a display panel including a touch screen on which a plurality of touch sensors are formed, a touch sensing circuit including at least one sensing unit which receives self capacitance signals of a first touch sensor and a second touch sensor adjacent to the first touch sensor among the plurality of touch sensors at differential input method and detects changes in capacitances of the first and second touch sensors, and a touch controller configured to analyze touch raw data received from the touch sensing circuit and calculate coordinates of a touch input position, wherein the at least one sensing unit generates delays corresponding to a difference between the capacitances of the adjacent first and second touch sensors, counts the generated delays, accumulates the number of delays, converts an accumulated value of the delays into digital data, and generates the touch raw data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A display device according to an exemplary embodiment of the invention may be implemented based on a flat panel display, such as a liquid crystal display (LCD), a field emission display (FED), a plasma display panel (PDP), an organic light emitting display, and an electrophoresis display (EPD). In the following description, the embodiment of the invention will be described using the liquid crystal display as an example of the flat panel display. Other flat panel displays may be used.

A touch screen coupled to the display device according to the embodiment of the invention may be implemented as a capacitive touch screen sensing a touch input (or proximity input) through a plurality of capacitive sensors. The capacitive touch screen includes a plurality of touch sensors. Each of the touch sensors may be represented as a self capacitance when viewed through an equivalent circuit. The touch screen may be formed on a display panel of the display device in various configurations illustrated in FIGS. 3 to 5.

Figure 1:
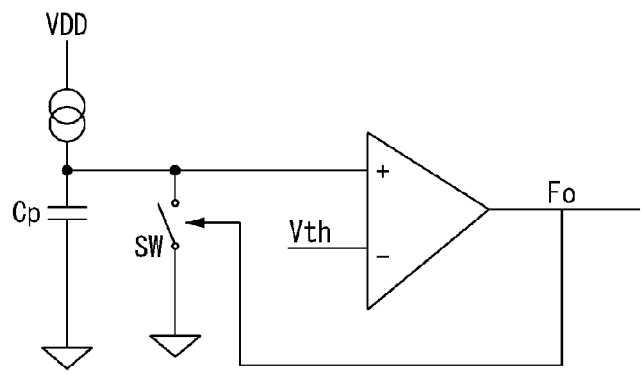
FIGS. 1 and 2 illustrate a method for detecting whether or not a touch operation is performed in a related art self capacitance touch screen.
Figure 2:
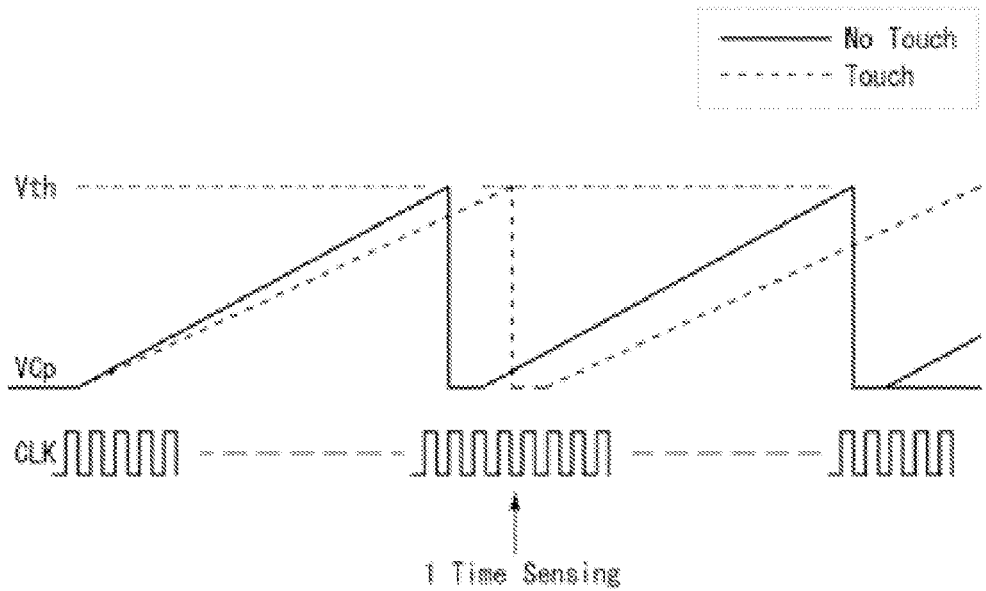
Figure 3:
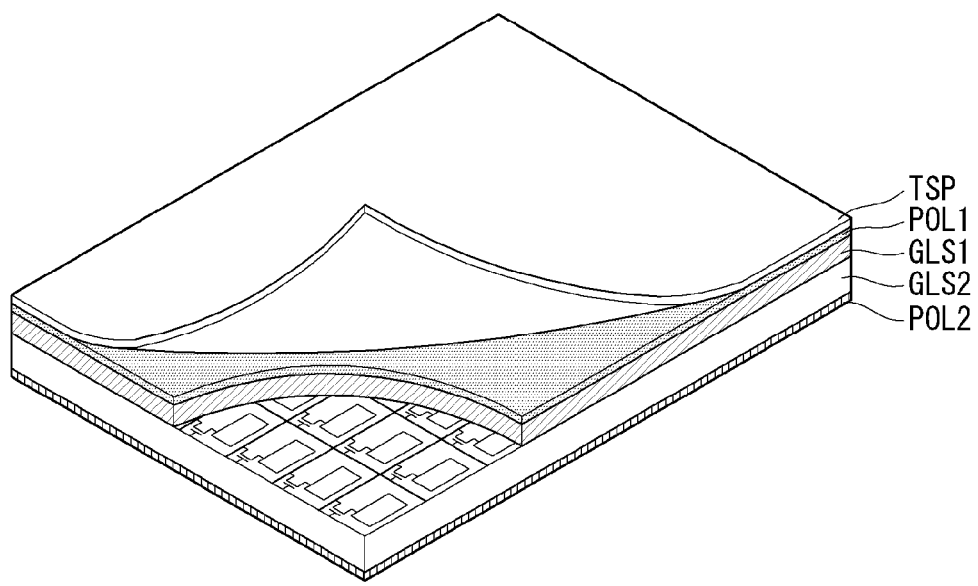
FIGS. 3 to 5 illustrate various combinations of a touch screen and a display panel according to an exemplary embodiment of the invention.
Figure 4:
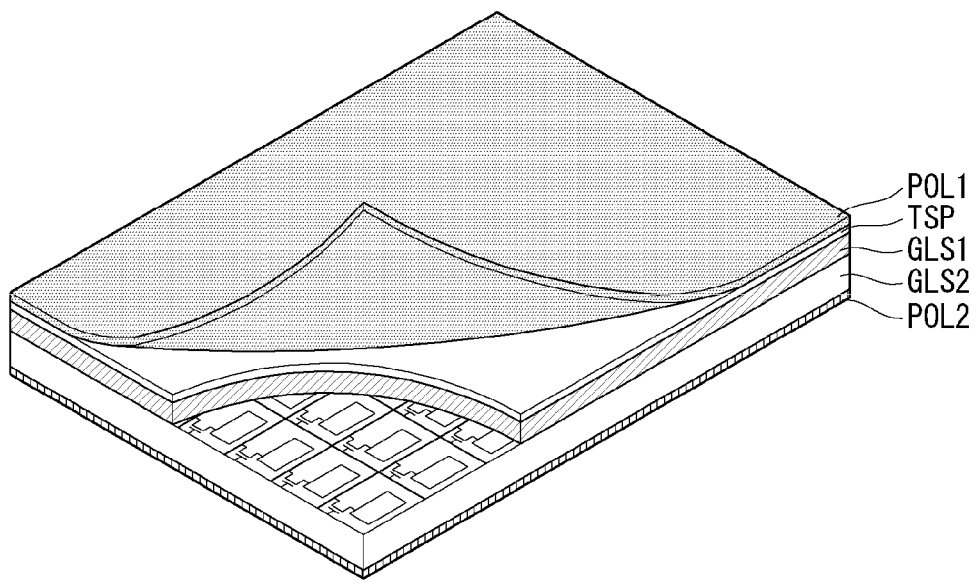
Figure 5:
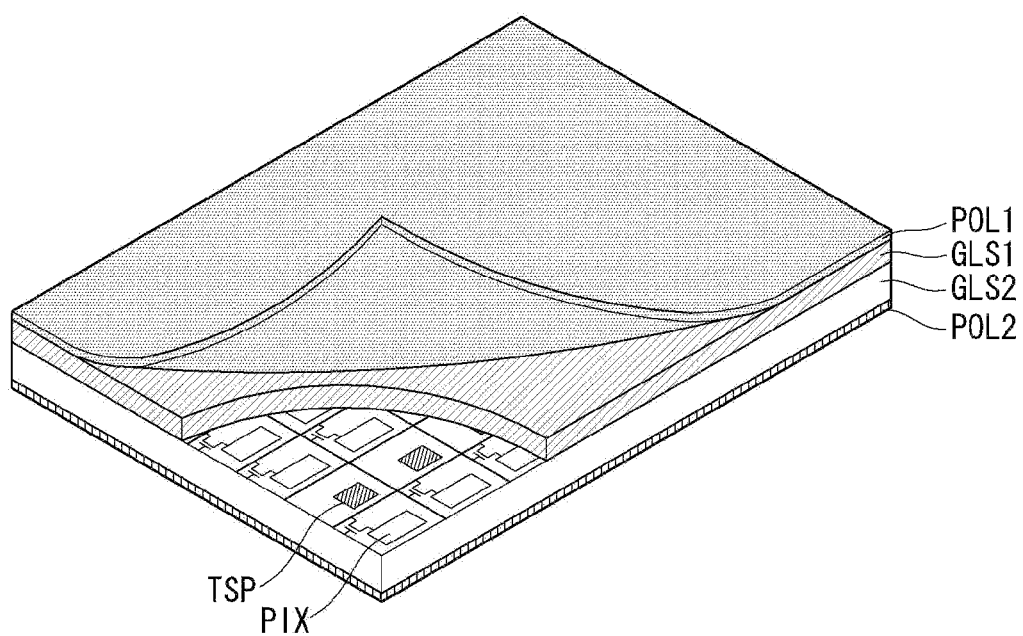

As shown in FIG. 3, a touch screen TSP according to the embodiment of the invention may be attached to an upper polarizing plate POL1 of a display panel. Alternatively, as shown in FIG. 4, the touch screen TSP may be formed between the upper polarizing plate POL1 and an upper substrate GLS1 of the display panel. Alternatively, as shown in FIG. 5, touch sensors of the touch screen TSP may be embedded in a pixel array of the display panel and may be connected to one another through lines. In FIGS. 3 to 5, "PIX" denotes a pixel electrode of a pixel, "GLS1" denotes a lower substrate, and "POL2" denotes a lower polarizing plate.

Figure 6:
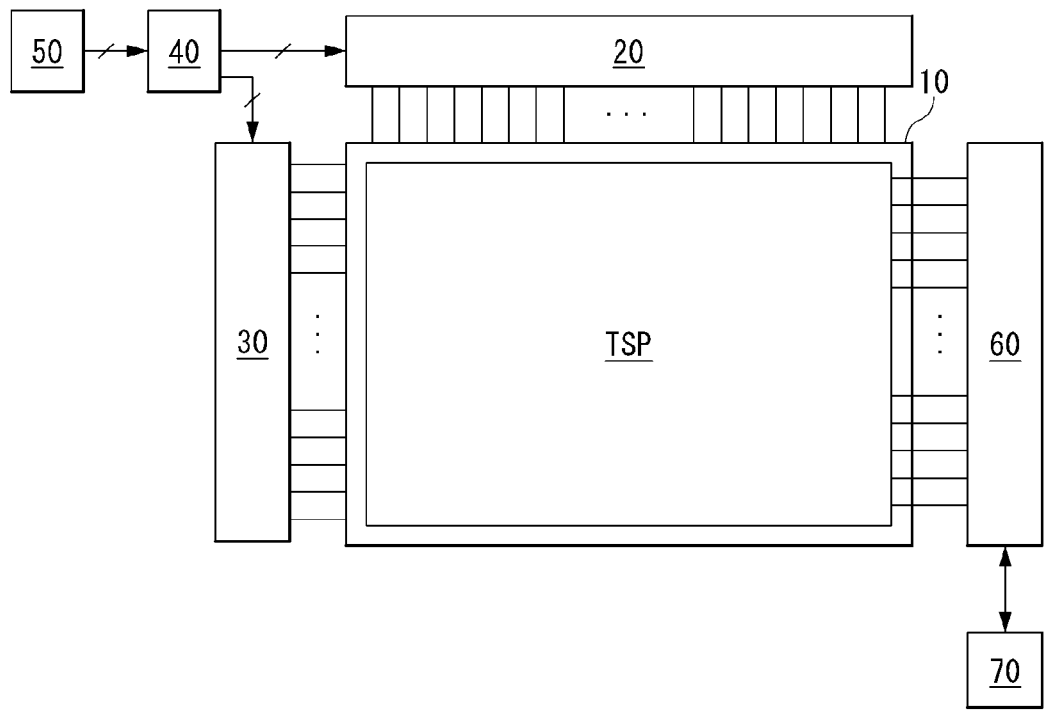
FIG. 6 is a block diagram of a display device according to an exemplary embodiment of the invention.
Figure 7:
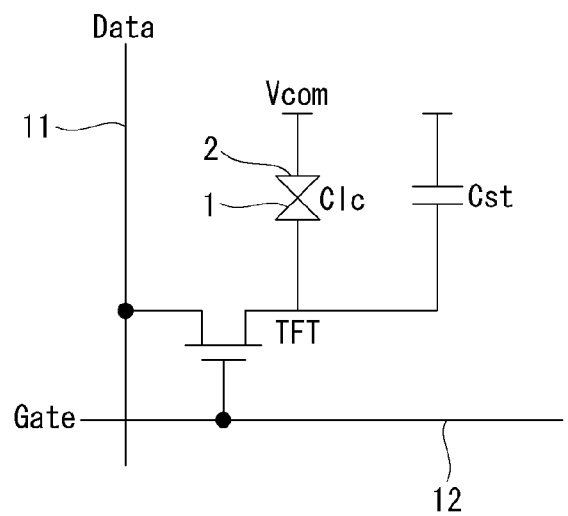
FIG. 7 is an equivalent circuit diagram showing a pixel of a display panel shown in FIG. 6.

FIG. 6 is a block diagram of a display device according to the embodiment of the invention. FIG. 7 is an equivalent circuit diagram showing a pixel of a display panel shown in FIG. 6.

As shown in FIGS. 6 and 7, the display device according to the embodiment of the invention includes a display panel 10, to which the touch screen TSP is coupled, a display driver, a touch screen driver, a host system 50, etc.

The display panel 10 includes a lower substrate, an upper substrate, and a liquid crystal layer formed between the lower substrate and the upper substrate. The lower substrate and the upper substrate may be manufactured using glass, plastic, film, etc. The display panel 10 includes pixels arranged in a matrix form. The lower substrate of the display panel 10 includes data lines 11, gate lines (or scan lines) 12 orthogonal to the data lines 11, a plurality of thin film transistors (TFTs) formed at crossings of the data lines 11 and the gate lines 12, a plurality of pixel electrodes 1 for charging the pixels to a data voltage, a plurality of storage capacitors, each of which is connected to the pixel electrode 1 and holds a voltage of the pixel, etc. Each pixel is driven by an electric field generated depending on a voltage difference between the data voltage supplied to the pixel electrode 1 and a common voltage Vcom supplied to a common electrode 2, thereby adjusting an amount of incident light transmitted by the pixel. Each of the TFTs is turned on in response to a gate pulse (or a scan pulse) from the gate line 12, thereby supplying the data voltage from the data line 11 to the pixel electrode 1. The common electrode 2 may be formed on the lower substrate or the upper substrate of the display panel 10.

The upper substrate of the display panel 10 may include black matrixes, color filters, etc. Polarizing plates are respectively attached to the upper and lower substrates of the display panel 10. Alignment layers for setting a pre-tilt angle of liquid crystals are respectively formed on the inner surfaces contacting the liquid crystals in the upper and lower substrates of the display panel 10. A spacer is formed between the upper and lower substrates of the display panel 10 to keep cell gaps of liquid crystal cells constant. The touch sensors of the touch screen TSP are formed on the display panel 10 in the various configurations illustrated in FIGS. 3 to 5.

The display panel 10 may be implemented in any known liquid crystal mode including a twisted nematic (TN) mode, a vertical alignment (VA) mode, an in-plane switching (IPS) mode, a fringe field switching (FFS) mode, etc. A backlight unit may be disposed in the rear of the display panel 10. The backlight unit is configured as one of an edge type backlight unit and a direct type backlight unit and provides light to the display panel 10.

The display driver includes a data driving circuit 20, a gate driving circuit 30, and a timing controller 40. The display driver writes data of an input image to the pixels of the display panel 10.

The data driving circuit 20 converts digital video data received from the timing controller 40 into positive and negative analog gamma compensation voltages and generates the data voltage. The data driving circuit 20 then supplies the data voltage to the data lines 11 under the control of the timing controller 40 and inverts a polarity of the data voltage.

The gate driving circuit 30 sequentially supplies the gate pulse synchronized with the data voltage to the gate lines 12 and selects horizontal pixel lines of the display panel 10 to which the data voltage will be applied.

The timing controller 40 supplies the digital video data received from the external host system 50 to the data driving circuit 20. The timing controller 40 receives timing signals, such as a vertical sync signal Vsync, a horizontal sync signal Hsync, a data enable signal DE, and a dot clock DCLK, from the host system 50 and generates timing control signals for controlling operation timings of the data driving circuit 20 and the gate driving circuit 30.

The touch screen driver includes a touch sensing circuit 60 and a touch controller 70.

Figure 11:
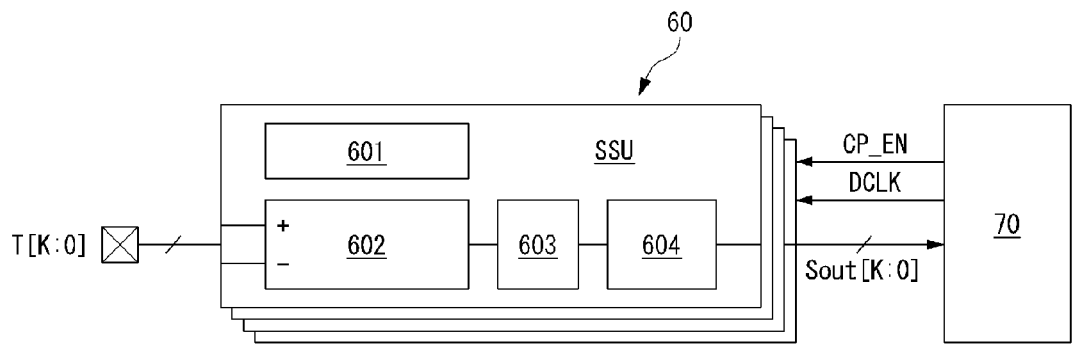
FIG. 11 schematically illustrates signals, which are input and output between a touch controller and a touch sensing circuit, and an internal configuration of a sensing unit of the touch sensing circuit.

The touch sensing circuit 60 detects capacitance changes of the touch sensors received from the touch screen TSP. As shown in FIG. 11, the touch sensing circuit 60 includes a plurality of sensing units connected to the touch sensors, so as to detect changes in the capacitances of the touch sensors. Each sensing unit receives self capacitance signals of the adjacent touch sensors at differential input method and detects changes in the capacitances of the touch sensors. Each sensing unit generates delays corresponding to a difference between the capacitances of the adjacent touch sensors and counts the generated delays. Each sensing unit accumulates the number of delays and then converts an accumulated value of the delays into digital data. Each sensing unit outputs the digital data to the touch controller 70. The digital data may be referred to as touch raw data.

The touch controller 70 produces control signals for controlling an operation of the touch sensing circuit 60. The touch controller 70 performs a previously determined touch recognition algorithm and analyzes the touch raw data received from the touch sensing circuit 60. Hence, the touch controller 70 calculates coordinates of a touch (or proximity) input position. The touch controller 70 transmits touch report data including the coordinates of the touch (or proximity) input position to the host system 50.

The host system 50 may be implemented as one of a navigation system, a set-top box, a DVD player, a Blu-ray player, a personal computer (PC), a home theater system, a broadcasting receiver, and a phone system. The host system 50 converts digital video data of the input image into a data format suitable for a resolution of the display panel 10 using a scaler and transmits the converted data and the timing signals to the timing controller 40.

Figure 8:
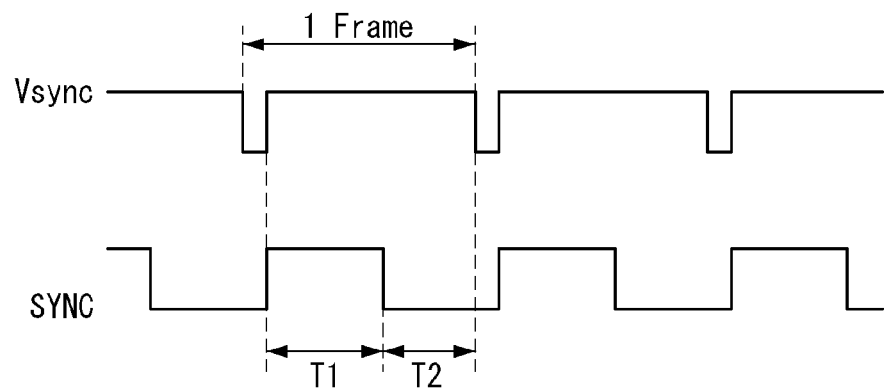
FIG. 8 is a waveform diagram of a vertical sync signal showing a time-division driving method of a touch screen and a display panel.

The host system 50 modulates the vertical sync signal Vsync, which is input along with the data of the input image, and thus may shorten a display driving period and may secure a touch screen driving period within one frame period. As shown in FIG. 8, the host system 50 may time-divide one frame period into a display driving period T1 and a touch screen driving period T2. In FIG. 8, the vertical sync signal Vsync is the timing signal defining one frame period, is synchronized with the input image data, and is input to the host system 50. A modulated vertical sync signal SYNC has the same frequency as the input vertical sync signal Vsync and has a duty ratio greater than the input vertical sync signal Vsync.

The host system 50 enables the touch sensing circuit 60 during the touch screen driving period T2 defined by a first logic level of the modulated vertical sync signal SYNC, thereby driving the touch screen driver during the touch screen driving period T2. The host system 50 transmits the digital video data of the input image and the timing signals synchronized with the digital video data to the timing controller 40 during the display driving period T1 defined by a second logic level of the modulated vertical sync signal SYNC, thereby driving the display driver during the display driving period T1. Hence, the host system 50 writes the input image data to the pixel array of the display panel 10. FIG. 8 shows an example where the first logic level and the second logic level of the modulated vertical sync signal SYNC are a low logic level and a high logic level, respectively. However, the embodiment of the invention is not limited thereto. For example, the first logic level and the second logic level of the modulated vertical sync signal SYNC may be set to a high logic level and a low logic level, respectively.

The host system 50 runs an application associated with the touch (or proximity) input in response to the touch report data received from the touch sensing circuit 60.

Figure 9:
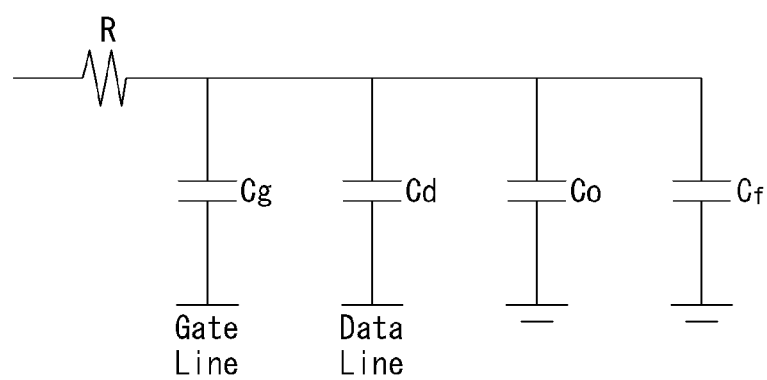
FIG. 9 is an equivalent circuit diagram of a capacitive touch screen.

FIG. 9 is an equivalent circuit diagram of the capacitive touch screen TSP.

As shown in FIG. 9, the capacitive touch screen TSP includes the plurality of touch sensors, and each touch sensor includes a resistor R and capacitors Cg, Cd, and Co for forming a self capacitance. The resistor R includes line resistors and parasitic resistors of the touch screen TSP and the display panel 10. The capacitor Cg is a capacitor between the line of the touch screen TSP and the gate line 12, and the capacitor Cd is a capacitor between the line of the touch screen TSP and the data line 11. The capacitor Co is a capacitor between other components excluding the data lines 11 and the gate lines 12 from the display panel 10 and the line of the touch screen TSP. When the touch sensors are charged by applying a constant current to the lines of the touch screen TSP, a waveform of the voltage charged to the touch sensors is delayed by a time constant of RC determined depending on the resistor R and the capacitors Cg, Cd, and Co. When the touch screen TSP is touched using a conductor or a finger, a capacitance increases by a capacitor Cf. Therefore, RC delay further increases. Hence, a slope of the self capacitance signal input from a touched portion of the touch screen TSP is changed compared to a non-touched portion.

Figure 10:
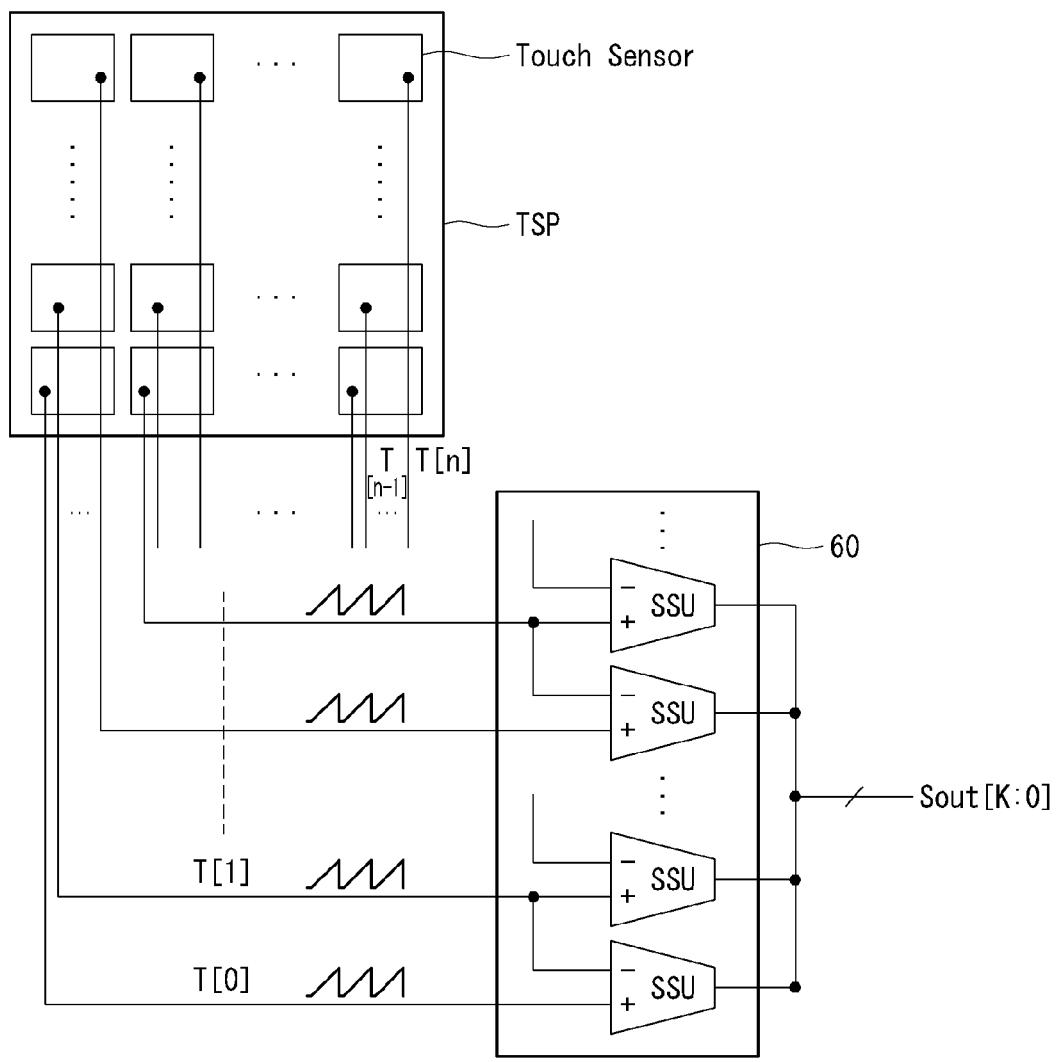
FIG. 10 illustrates a relationship between touch sensors of a touch screen and sensing units of a touch sensing circuit.

FIG. 10 illustrates a relationship between the touch sensors of the touch screen TSP and sensing units of the touch sensing circuit 60.

n touch channels are respectively connected to the n touch sensors of the touch screen TSP. The touch sensing circuit 60 including n sensing units SSU receives n self capacitance signals T[1] to T[n] through the n touch channels. The n sensing units SSU are respectively connected to the n touch channels and receive the n self capacitance signals T[1] to T[n]. Each sensing unit SSU is connected to not only a first touch channel connected to each sensing unit SSU but also a second touch channel adjacent to the first touch channel. Each sensing unit SSU differentially receives a first self capacitance signal received from the first touch channel and a second self capacitance signal received from the second touch channel. The touch sensing circuit 60 detects changes in the capacitance and outputs touch raw data Sout of predetermined bits.

Each of the touch sensors shown in FIG. 10 includes a transparent electrode formed of a transparent conductive material such as indium tin oxide (ITO). The constant current is supplied to the transparent electrodes of the touch sensors during the touch screen driving period T2 shown in FIG. 8, and the common voltage Vcom shown in FIG. 7 is supplied to the transparent electrodes of the touch sensors during the display driving period T1 shown in FIG. 8. Thus, each transparent electrode serves as both the common electrode of the pixel and an electrode of the touch sensor. Each transparent electrode has a transparent electrode pattern greater than the size of the pixel electrode 1, so that the transparent electrodes overlap the plurality of pixel electrodes 1 and supply the common voltage to the plurality of pixels.

FIG. 11 schematically illustrates signals, which are input and output between the touch controller 70 and the touch sensing circuit 60, and an internal configuration of the sensing unit SSU of the touch sensing circuit 60.

As shown in FIG. 11, each sensing unit SSU of the touch sensing circuit 60 includes a charge pump unit 601, a voltage-to-current converter 602, a voltage controlled delay line (VCDL) circuit 603, and a delay detection circuit 604.

The charge pump unit 601 supplies the constant current to not only a first touch sensor connected to the charge pump unit 601 but also a second touch sensor adjacent to the first touch sensor every predetermined period of time in response to a current supply enable signal CP_EN received from the touch controller 70. The current supply enable signal CP_EN is a control signal, which supplies the constant current to the touch sensor to thereby charge the touch sensor during a high period of the current supply enable signal CP_EN and discharges the touch sensor during a low period of the current supply enable signal CP_EN. The high period of the current supply enable signal CP_EN may be synchronized with the touch screen driving period T2 shown in FIG. 8.

The voltage-to-current converter 602 has a differential input structure to use the first self capacitance signal from the first touch sensor as a first input and use the second self capacitance signal from the second touch sensor as a second input. The voltage-to-current converter 602 converts the first self capacitance signal into a first current and converts the second self capacitance signal into a second current. The voltage-to-current converter 602 then obtains a change amount of the first current and a change amount of the second current before and after a touch operation.

The VCDL circuit 603 generates a delay corresponding to change in capacitances of the first and second self capacitance signals in response to the dot clock DCLK received from the touch controller 70. The dot clock DCLK is an input pulse generating the delay. The dot clock DCLK may be input N times during the high period of the current supply enable signal CP_EN, where N is a positive integer. Hence, the dot clock DCLK may be sensed N times. A magnitude of the delay varies depending on a bias voltage, which is controlled by a change amount of the first and second currents.

The delay detection circuit 604 counts the delays and accumulates the number of delays. The delay detection circuit 604 converts an accumulated value of the delays into digital data Sout[K:0] and outputs the digital data Sout[K:0] to the touch controller 70. When the first touch sensor is touched, an amount of the first current decreases. Hence, the magnitude of the delay increases. As a result, the accumulated value of the delays passing through an internal delay cell decreases. Namely, an accumulated value of the delays at a touched portion is different from an accumulated value of the delays at a non-touched portion.

Figure 12A:
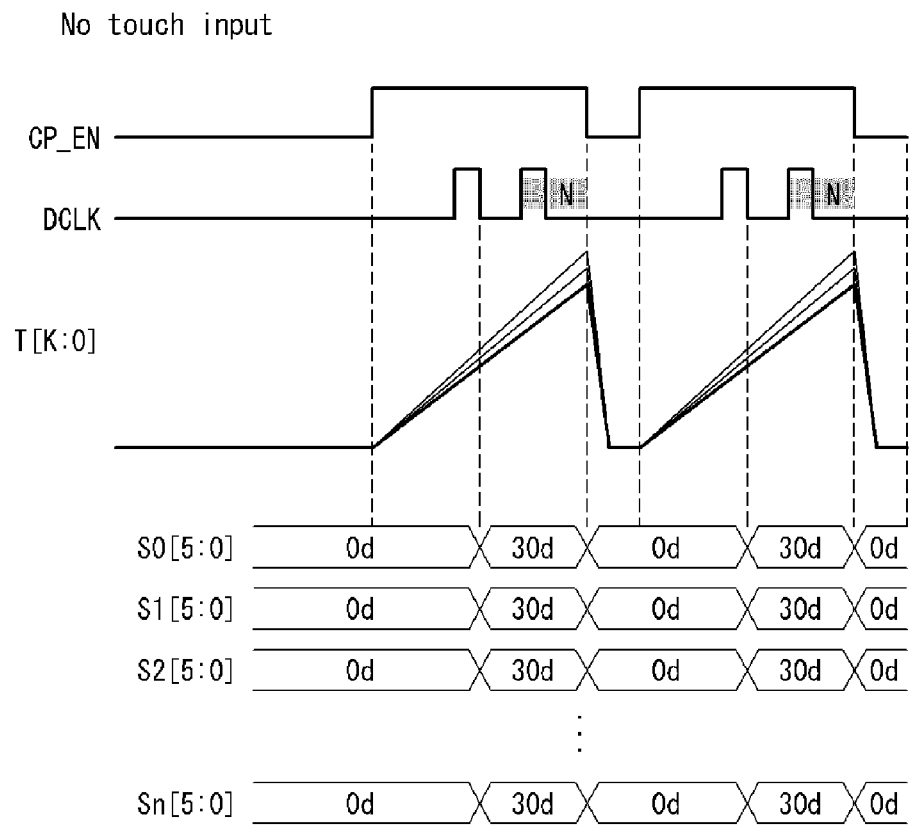
FIG. 12A shows a timing diagram of a sensing unit when there is no touch input.
Figure 12B:
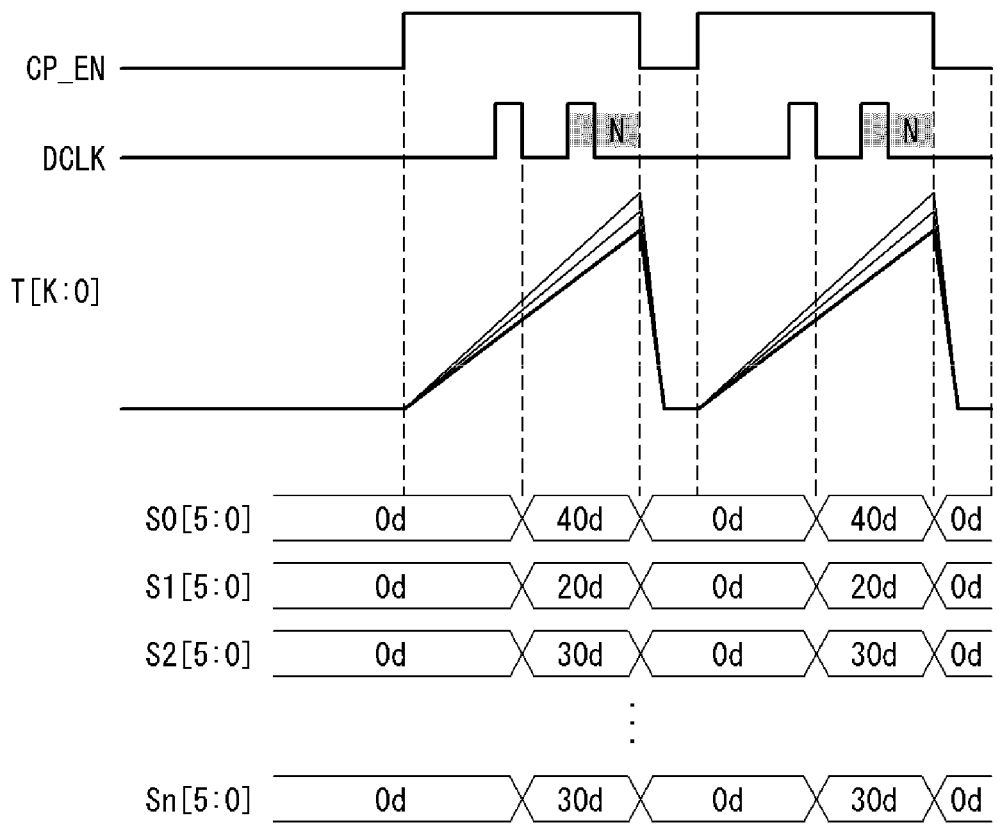
FIG. 12B shows a timing diagram of a sensing unit when a touch sensor is touched.

FIG. 12A shows a timing diagram of the sensing unit SSU when there is no touch input, and FIG. 12B shows a timing diagram of the sensing unit SSU when the touch sensor outputting a self capacitance signal T[1] is touched. In FIGS. 12A and 12B, an additional character 'd' attached to the accumulated value of the delays indicates a decimal number.

As shown in FIG. 12A, when there is no touch input, accumulated values S0 to Sn of delays output from the sensing unit SSU are the same in all of the touch channels. However, when a touch input is applied, an accumulated value of a first touch channel, on which the touch input is applied, and an accumulated value of a second touch channel connected to the same sensing unit as the first touch channel are changed compared to accumulated values of delays in other touch channels. For example, as shown in FIG. 12B, when the touch input is applied to the touch sensor outputting a self capacitance signal T[1], an accumulated value S1 of delays in a first touch channel and an accumulated value S0 of delays in a second touch channel adjacent to the first touch channel are '20d' and '40d', respectively, and are different from accumulated values S2 to Sn (i.e., '30d') of delays in other touch channels. The first and second touch channels are connected to the same sensing unit at the differential inputs and are coupled with each other. Therefore, when one of the first and second touch channels changes, the other touch channel changes.

Figure 13:
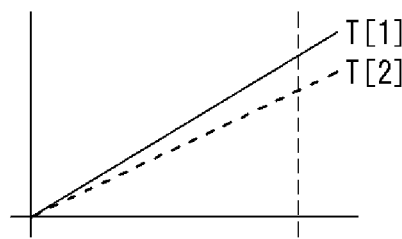
FIG. 13 illustrates changes in a charge slope of a self capacitance signal depending on a touch input.
Figure 13:
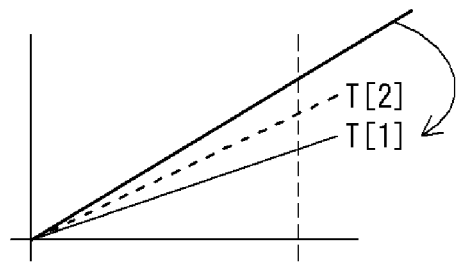
Figure 13:
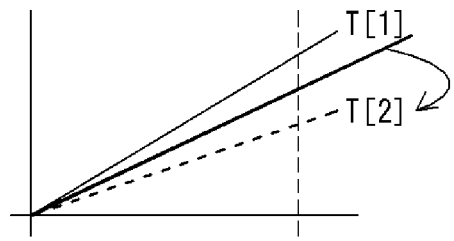

FIG. 13 illustrates changes in a charge slope of a self capacitance signal depending on a touch input. The charge slope of the self capacitance signal is reduced due to an increase in a capacitance resulting from the touch input. For example, as shown in (A) of FIG. 13, it is assumed that a charge slope of a self capacitance signal T[1] is greater than a charge slope of a self capacitance signal T[2] in a state where there is no touch input. In this instance, as shown in (B) of FIG. 13, when the touch input is applied to the touch sensor outputting the self capacitance signal T[1], the charge slope of the self capacitance signal T[1] may be less than the charge slope of the self capacitance signal T[2]. Further, as shown in (C) of FIG. 13, when the touch input is applied to the touch sensor outputting the self capacitance signal T[2], a difference between the charge slopes of the self capacitance signals T[1] and T[2] in (C) of FIG. 13 may be greater than a difference between the charge slopes of the self capacitance signals T[1] and T[2] in (A) of FIG. 13.

Figure 14:
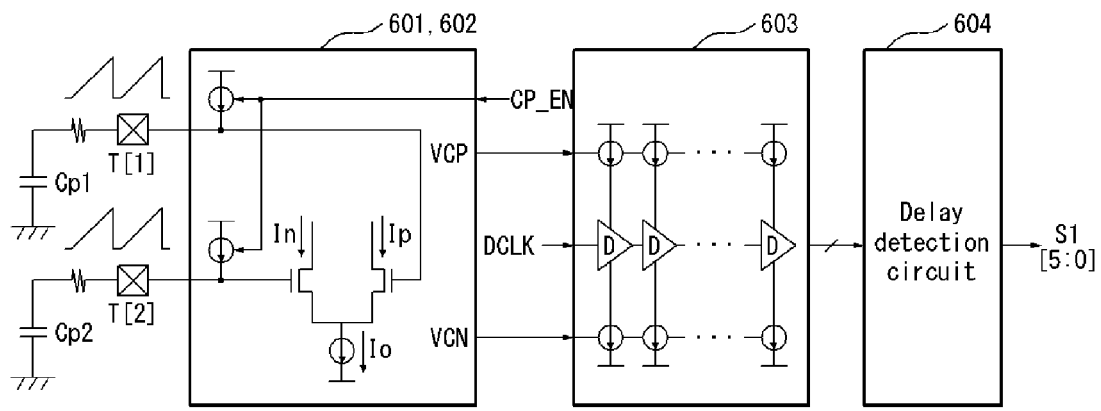
FIGS. 14 and 15 illustrate an entire sensing operation of a display device according to an exemplary embodiment of the invention.
Figure 15:
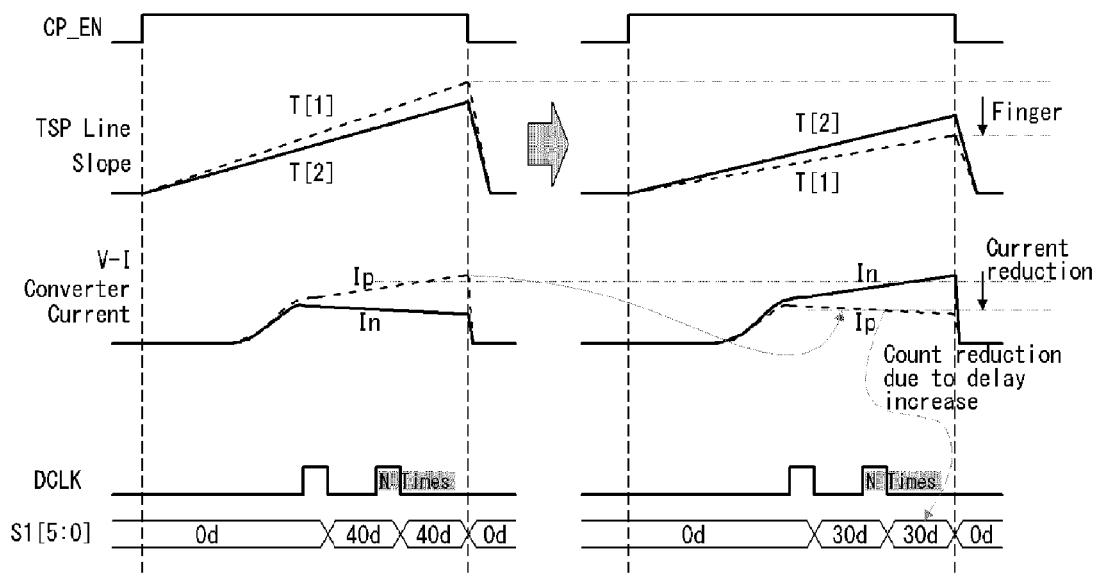

FIGS. 14 and 15 illustrate an entire sensing operation of the display device according to the embodiment of the invention.

As shown in FIG. 14, the display device according to the embodiment of the invention supplies the constant current to first and second touch sensors Cp1 and Cp2, which are connected to the same sensing unit at the differential inputs and are coupled to each other, every predetermined period of time in response to the current supply enable signal CP_EN. As shown in FIG. 15, when the touch input is applied to the first touch sensor Cp1, a charge slope of a self capacitance signal T[1] is less than a charge slope of the self capacitance signal T[1] when there is no touch input. As a result, a first current Ip of the voltage-to-current converter 602 decreases, and a second current In of the voltage-to-current converter 602 is held. A first bias voltage VCP of the VCDL circuit 603 changes depending on the first current Ip, and a second bias voltage VCN of the VCDL circuit 603 changes depending on the second current In. When the first current Ip decreases because of changes in the first and second bias voltages VCP and VCN, a magnitude of the delay increases. As a result, as shown in FIG. 15, the accumulated value of the delays used to decide whether or not the touch input is applied is reduced from '40d' to '30d'.

Figure 16:
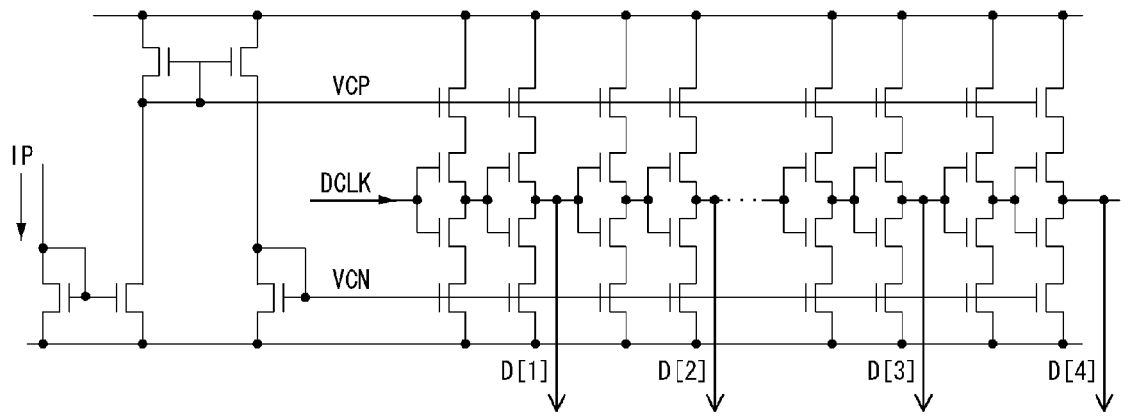
FIG. 16 illustrates an example of configuration of a VCDL circuit.
Figure 17:
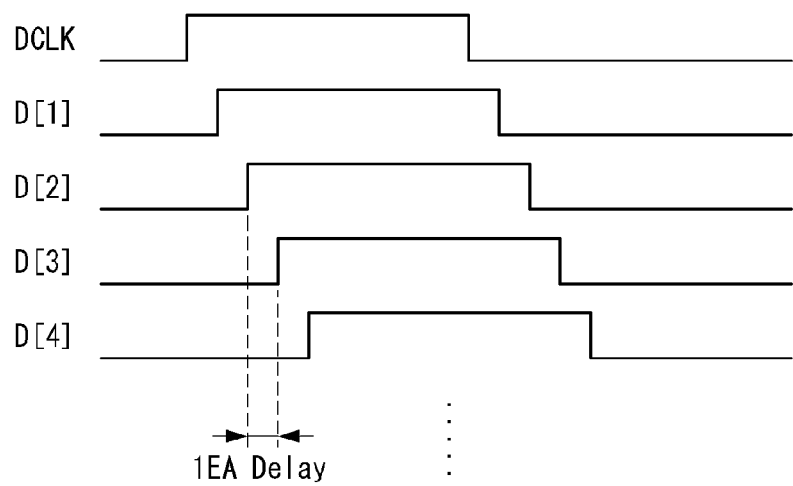
FIG. 17 illustrates an example of a timing diagram depending on dot clocks.
Figure 18:
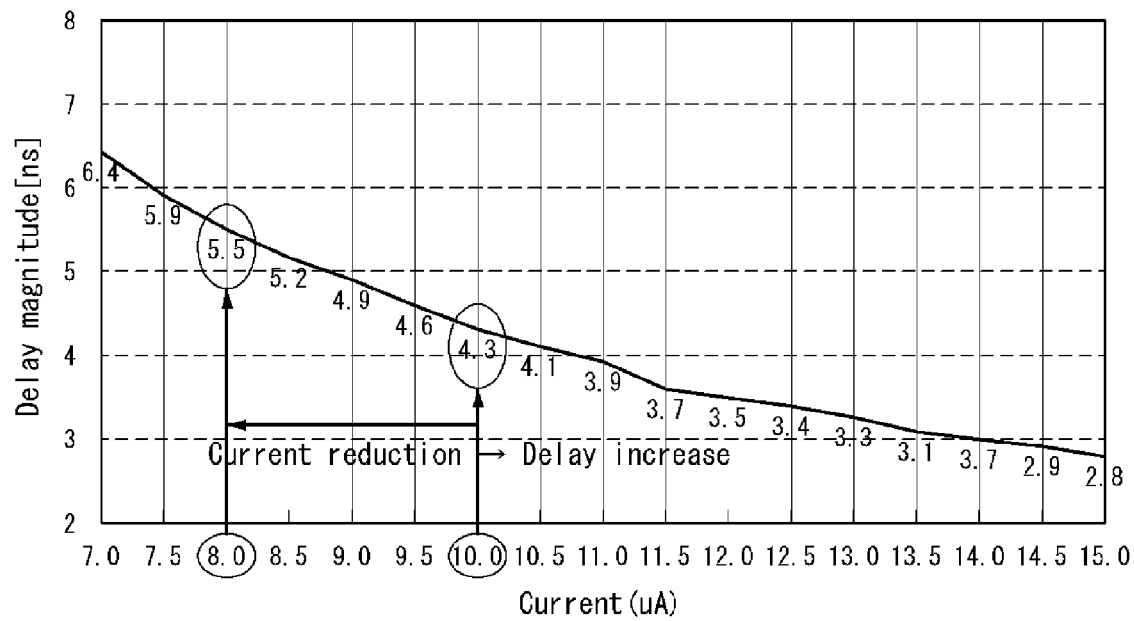
FIG. 18 illustrates changes in a delay magnitude depending on changes in a current.

FIG. 16 illustrates an example of configuration of the VCDL circuit 603. FIG. 17 illustrates an example of a timing diagram depending on the dot clock DCLK. FIG. 18 illustrates changes in a delay magnitude depending on changes in a current.

As shown in FIGS. 16 and 17, signals D[1] to D[4], which are delayed by a uniform magnitude depending on the dot clock DCLK, are output from the VCDL circuit 603. As shown in FIG. 18, as the first current Ip shown in FIG. 16 decreases, a magnitude (i.e., a delay width 1EA shown in FIG. 17) of the delay increases. Hence, the accumulated value of delays, through which the dot clock DCLK passes, may change during a high period of the same dot clock DCLK. For example, it is assumed that the high period of the dot clock DCLK is 100 ns. When the first current Ip is 10 us, the magnitude of the delay is 4.3 and the accumulated value of delays is 23 (=100/4.3). Further, when the first current Ip is 8 us, the magnitude of the delay is 5.5 and the accumulated value of delays is 18 (=100/5.5).

Figure 19:
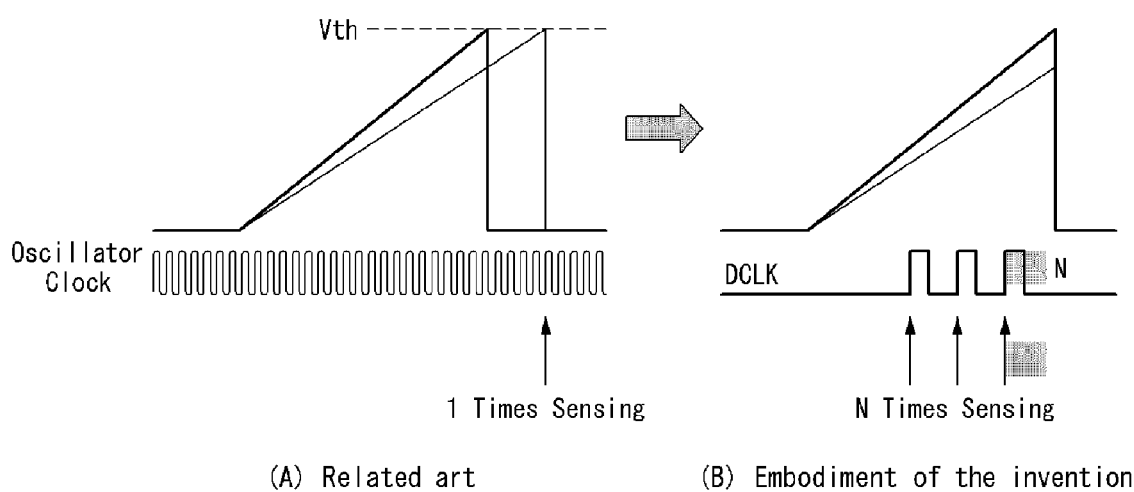
FIG. 19 illustrates a comparison between characteristics of a related art and an exemplary embodiment of the invention.

FIG. 19 illustrates a comparison between characteristics of a related art and the embodiment of the invention.

As shown in FIG. 19, the related art necessarily required counting clocks of a high frequency so as to improve the sensing sensitivity and thus had the problem of an increase in power consumption. Further, because the related art could perform a sensing operation only once within a given period of time, a detection capacity of a finger capacitance less than a self capacitance was reduced. Hence, the sensing sensitivity was reduced.

On the other hand, because the embodiment of the invention can find out a difference between the adjacent self capacitance signals through the accumulated value of the delays using the dot clock of a low frequency, electric power required in the sensing operation may be reduced. Further, the embodiment of the invention inputs the dot clocks many times for a given period of time (i.e., the high period of the current supply enable signal CP_EN) and thus can perform the sensing operation several times. Therefore, the embodiment of the invention may improve the detection capacity of the finger capacitance less than the self capacitance and may improve the sensing sensitivity.

Furthermore, the embodiment of the invention may be applied to not only a single touch method recognizing only one touch point but also a multi-touch method capable of simultaneously recognizing a plurality of touch points. Because the multi-touch method further requires the low power consumption and the improvement of the sensing sensitivity compared to the single touch method, the embodiment of the invention can show a stronger effect in the multi-touch method.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing device comprising:
a display panel including a touch screen on which a plurality of touch sensors are formed;
a touch sensing circuit including at least one sensing unit which receives self capacitance signals of a first touch sensor and a second touch sensor adjacent to the first touch sensor among the plurality of touch sensors at differential input method and detects changes in capacitances of the first and second touch sensors; and
a touch controller configured to analyze touch raw data received from the touch sensing circuit and calculate coordinates of a touch input position,
wherein the at least one sensing unit generates delays corresponding to a difference between the capacitances of the adjacent first and second touch sensors, counts the generated delays, accumulates a number of the delays, converts an accumulated value of the delays into digital data, and generates the touch raw data, and
wherein the sensing unit senses changes in capacitances of the first and second touch sensors multiple times based on a dot clock during a previously set period, in which the self capacitance signals of the first and second touch sensors continuously rise.

2. The touch sensing device of claim 1, wherein the sensing unit includes:
a charge pump unit configured to supply a constant current to the first touch sensor and the second touch sensor every predetermined period of time in response to a current supply enable signal received from the touch controller;
a voltage-to-current converter configured to have a differential input structure, in which a first self capacitance signal from the first touch sensor is used as a first input and a second self capacitance signal from the second touch sensor is used as a second input, convert the first self capacitance signal into a first current, and convert the second self capacitance signal into a second current;
a voltage controlled delay line circuit configured to generate delays corresponding to changes in capacitances of the first self capacitance signal and the second self capacitance signal in response to the dot clock received from the touch controller; and
a delay detection circuit configured to count the generated delays, accumulate the number of the delays, and convert the accumulated value of the delays into the digital data.

3. The touch sensing device of claim 2, wherein a magnitude of the delay varies depending on a bias voltage of the voltage controlled delay line circuit, which is controlled by a change amount of the first and second currents.

4. The touch sensing device of claim 2, wherein the dot clock is input N times during a high period of the current supply enable signal indicating the supply of the constant current, where N is a positive integer greater than 1.

5. The touch sensing device of claim 4, wherein one frame period is time-divided into a display driving period, in which an image is displayed on the display panel, and a touch screen driving period, in which the touch screen is driven,
wherein the high period of the current supply enable signal is synchronized with the touch screen driving period.

6. The touch sensing device of claim 1, wherein the sensing unit senses changes in capacitances of the touch sensors multiple times, which are the same as the number of times the input of a dot clock occurs, during a previously set period, in which the self capacitance signals of the first and second touch sensors continuously rise.

7. A touch sensing device comprising:
a display panel including a touch screen on which a plurality of touch sensors are formed;
a touch sensing circuit including at least one sensing unit which receives self capacitance signals of the touch sensors and detects changes in capacitances of the touch sensors; and
a touch controller configured to analyze touch raw data received from the touch sensing circuit and calculate coordinates of a touch input position,
wherein the sensing unit senses changes in capacitances of the touch sensors multiple times based on a dot clock during a previously set period, in which the self capacitance signals of the touch sensors continuously rise.

8. The touch sensing device of claim 7, wherein the dot clock is input N times during a high period of a current supply enable signal received from the touch controller, where N is a positive integer greater than 1.

9. The touch sensing device of claim 8, wherein one frame period is time-divided into a display driving period, in which an image is displayed on the display panel, and a touch screen driving period, in which the touch screen is driven,
wherein the high period of the current supply enable signal is synchronized with the touch screen driving period.

10. The touch sensing device of claim 7, wherein the sensing unit senses changes in capacitances of the touch sensors multiple times, which are the same as the number of times the input of a dot clock occurs, during a previously set period, in which the self capacitance signals of the touch sensor continuously rise.

* * * * *